United States Patent [19]
Reifenberg et al.

[11] 3,789,057
[45] Jan. 29, 1974

[54] A PROCESS FOR PREPARING SYMETRICAL TRIORGANOTIN HALIDES

[75] Inventors: Gerald H. Reifenberg, Hightstown; Melvin H. Gitlitz, Edison, both of N.J.

[73] Assignee: M & T Chemicals Inc., Greenwich, Conn.

[22] Filed: Apr. 14, 1971

[21] Appl. No.: 134,045

Related U.S. Application Data

[63] Continuation-in-part of Ser. No. 816,783, April 19, 1969, Pat. No. 3,607,891, which is a continuation-in-part of Ser. No. 773,331, Nov. 4, 1968, Pat. No. 3,564,033.

[52] U.S. Cl. ................. 260/429.7, 424/288, 71/97
[51] Int. Cl. ............................................. C07f 7/22
[58] Field of Search ............................. 260/429.7

[56] References Cited
UNITED STATES PATENTS
3,475,473 10/1969 Tahara et al. .................. 260/429.7
3,475,472 10/1969 Suzuki et al. ................... 260/429.7

*Primary Examiner*—Werten F. W. Bellamy
*Attorney, Agent, or Firm*—Kenneth G. Wheeless; Robert P. Grindle; Robert P. Auber

[57] ABSTRACT

Novel organotin compounds of the formula $R_nR'_{(3-n)}SnX$ are prepared by reacting equimolar amounts of $R_{(n+1)}R'_{3-n}Sn$ and a stannic halide in an inert hydrocarbon solvent at temperatures between about -25° and 80° C. R represents a monovalent linear aliphatic hydrocarbon radical containing up to six carbon atoms, R' represents a monovalent aliphatic or cycloaliphatic hydrocarbon radical containing up to eight carbon atoms, with the proviso that the molecular weight of R' exceeds that of R by at least 42 except when R' is a cycloaliphatic hydrocarbon radical. X represents a chlorine or bromine atom and n represents an integer selected from the group consisting of 1 and 2.

7 Claims, No Drawings

A PROCESS FOR PREPARING SYMETRICAL TRIORGANOTIN HALIDES

PROCESS AND PRODUCT

This application is a continuation-in-part of application Ser. No. 816,783, filed Apr. 19, 1969 now U.S. Pat. No. 3,607,891, which in turn is a continuation-in-part of application Ser. No. 773,331, filed Nov. 4, 1968 now U.S. Pat. No. 3,564,033.

BACKGROUND OF THE INVENTION

This invention relates to novel organotin bromides and chlorides containing two different organic groups. This invention further relates to a method for preparing these novel compounds and others in high yield and purity.

"Asymmetric" triorganotin halides of the formula $R_nR'_{3-n}SnX$, wherein R and R' represent different hydrocarbon radicals, have been prepared by reacting an organotin halide $R_nSnX_{4-n}$ with a stoichiometric amount of a Grignard reagent R'MgX (one mole of halide per 3-n moles of Grignard reagent). The yields reported for this type of reaction are very low (less than 20 percent). A second procedure often employed for preparing organotin monohalides comprises reacting an asymmetric tetraorgano tin, i.e., $R_nR'_{4-n}Sn$ with a halogen, preferably bromine or iodine. Although fair yields of the desired product can be obtained by a judicious selection of starting materials and reaction conditions, it is often difficult if not impossible to separate the desired product from the reaction mixture, which may contain di- and trihalides resulting from cleavage of more than one hydrocarbon group from the molecule.

In contrast to prior art methods, the process of the present invention yields the desired triorganotin halide in high yield and purity following a one-step isolation procedure, i.e., the addition of water or aqueous acid to the reaction mixture.

SUMMARY OF THE INVENTION

One aspect of this invention concerns a process for preparing asymmetric organotin halides represented by the formula $R_nR'_{(3-n)}SnX$ wherein R represents a monovalent linear aliphatic hydrocarbon radical containing up to six carbon atoms, R' represents a monovalent aliphatic or cycloaliphatic hydrocarbon radical containing up to eight carbon atoms, with the proviso that the molecular weight of R' exceeds that of R by at least 42 except when R' represents a cycloaliphatic hydrocarbon radical; X represents a chlorine or bromine atom and n represents an integer selected from the group consisting of 1 and 2. The process comprises reacting substantially equimolar quantities of a tetraorganotin compound $R_{(n+1)}R'_{(3-n)}Sn$ and a stannic tetrahalide, $SnX_4$, at temperatures between about $-25°$ and $80°$ C. and in an inert hydrocarbon diluent for a period of time sufficient to form $R_nR'_{3-n}SnX$, adding water or an aqueous solution of a suitable inorganic acid, e.g., hydrochloric acid to dissolve the by-product $RSnX_3$ and isolating $R_nR'_{3-n}SnX$.

A second aspect of this invention relates to certain novel asymmetric organotin chlorides and bromides which are prepared in high yield and purity using the process of the invention. The hydrocarbon group of the organotin halides may contain inert substituents.

DETAILED DESCRIPTION OF THE INVENTION

A. Preparation of $R_{(n-1)}R'_{(3-n)}Sn$

The asymmetric tetraorganotin compound, which is reacted with a tin tetrahalide to form the products of this invention, can be prepared by a number of known reactions, some of which are discussed by Gilman et al. (Chemical Reviews, October, 1969, pp. 459–539). A preferred method comprises reacting the appropriate mono-, di- or tri-organotin halide with a Grignard reagent, i.e., an organo-magnesium halide RMgX or R'MgX, in an inert solvent, followed by hydrolysis of the resultant product. The overall reaction between these compounds is believed to proceed as follows, using $R_2SnCl_2$ and R'MgCl as an example:

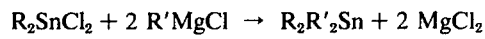

$$R_2SnCl_2 + 2\ R'MgCl \rightarrow R_2R'_2Sn + 2\ MgCl_2$$

More generally, a compound of the formula $R_aR'_{4-a}Sn$ may be prepared using at least 4-a moles of grignard reagent R'MgCl per mole of $R_aSnCl_{4-a}$. Alternatively, the R group may be present on the Grignard reagent and the R' group on the organotin halide, depending upon the availability of the respective starting materials.

The organotin halide is conveniently prepared by reacting a stannic halide, e.g., stannic chloride with a stoichiometric amount of the appropriate tetraorgano tin compound. For example, dimethyltin chloride may be prepared using a 1 mole of tetramethyltin per mole of stannic chloride. Methods for preparing Grignard reagents from magnesium metal and an organic halide are well known in the art and need not be described here. An excess of the Grignard reagent R'MgCl or RMgCl is desirable to minimize formation of by-products, such as incompletely alkylated organotins. The reaction between the Grignard reagent and organotin halide is exothermic, and cooling may, therefore, be required to maintain the temperature of the reaction mixture within the desired range of between 25° and 95° C., preferably less than 80° C. The reaction time may be from 1 to 3 hours, and the resultant asymmetric organotin recovered by conventional means, e.g., extraction or distillation.

Grignard reagents are usually prepared in relatively low boiling linear or cyclic ethers, which can be replaced by the higher boiling hydrocarbon solvents employed for the preparation of asymmetric tetraorganotins, $R_{(n+1)}R'_{(3-n)}Sn$. To avoid the formation of highly viscous mixtures which may be difficult to process, it may be preferable to add the hydrocarbon solvent to the ether-Grignard reagent mixture and distill out the ether prior to addition of the organotin halide.

B. Preparation of $R_nR'_{(3-n)}SnX$

The asymmetric organotin halides of this invention are prepared by reacting an appropriate tetraorganotin $R_{n+1}R'_{(3-n)}Sn$, prepared as described in the preceding Section A, with a stoichiometric amount of a stannic halide salt, preferably stannic chloride. As previously defined, R represents a monovalent aliphatic hydrocarbon radical exhibiting a molecular weight that is at least 42 less than that of R', except when R' represents a cyclohexyl radical, in which instance this requirement does not apply. Under these conditions, one of the R groups will be replaced when the asymmetric tetraorganotin is reacted with stannic chloride or stannic bromide in a molar proportion of one to one.

It is known to prepare organotin halides wherein all the organic groups are identical by reacting the corresponding tetraorganotin with a stoichiometric amount of stannic halide. A process similar to this is described in our co-pending application Ser. No. 816,783 for the preparation of tricyclohexyltin chloride from tricyclohexylbutyl tin. The molar ratio of reagents depends upon the number of organic groups to be replaced by halogen. Previous attempts to apply this process to various tetraorganotin compounds containing different organic groups resulted in uncontrollable cleavage of the organic groups, and it is extremely difficult to separate the desired product, which is obtained in very low yield, from the resultant mixtures. Surprisingly, it has been found that by a judicious selection of (a) substituents (R and R') on the tetraorganotin and (b) reaction conditions, it is possible to control the cleavage reaction and isolate high yields (greater than 90 percent) of substantially pure product.

The reaction between the stannic halide and tetraorganotin compound should be performed under anhydrous conditions at temperatures between about $-25°$ and $80°$ C., preferably between $+25°$ and $80°$ C. in a hydrocarbon solvent. Preferred solvents include pentane, hexane, and cyclohexane.

Either or both of the R' and R hydrocarbon radicals may contain inert substituents, e.g., alkyl or alkoxide groups.

Preferably the stannic halide is dissolved in a suitable solvent and the solution added dropwise to a solution containing the tetraorganotin compound in the same solvent. The temperature is preferably maintained below about $30°$ C. during the addition, which requires about 1 hour, after which the reaction mixture is heated to a temperature between $35°$ and $80°$ C. Preferably the temperature employed is the reflux temperature of the reaction mixture. Heating is continued for between about 15 and 60 minutes to ensure complete reaction. The reaction mixture is allowed to cool to ambient temperature, and is then extracted with one or more portions of water or aqueous mineral acid, in which the by product of the reaction, a monoorgano trihalo tin, $RSnX_3$, is soluble. The desired product remains in the organic phase, and is readily isolated by distilling away the hydrocarbon solvent. Usually no further purification is required. The organic layer should preferably be dried following the extraction step. Any of the conventional drying agents are suitable, provided that they will not react with the triorganotin halide or the hydrocarbon solvent. Preferred drying agents include anhydrous magnesium sulfate, anhydrous sodium sulfate and anhydrous calcium sulfate.

The asymmetric triorganotin halides, $R_nR'_{3-n}SnX$, which can be prepared using the process of this invention include those wherein R and R' represent aliphatic hydrocarbon radicals including such radicals when inertly substituted. R represents an alkyl radical, and may be methyl, ethyl, n-propyl, isopropyl, n-butyl, sec-butyl, amyl, etc. When R' is alkyl, the lowest molecular weight group which can be present as R' is butyl, in accordance with the previously stated proviso that the molecular weight of the R' substituent must exceed that of the R substituent by at least 42, the only exception being when R' is a cycloalkyl radical. Preferred alkyl substituents for R and R' contain less than nine carbon atoms. When R' is cycloalkyl it may be cyclohexyl.

C. Uses of asymmetric triorganotin halides, $R_nR'_{3-n}SnX$

The triorganotin halides of this invention are biologically active and effectively protect many materials, particularly crops, against a variety of insects, fungi, and bacteria, as demonstrated in the accompanying examples.

The organotin halides of this invention can be converted using known reactions to organotin derivatives that are useful in numerous applications. These include pesticides, bacteriocides, fungicides, stabilizers for synthetic resins and polymerization catalysts.

The following examples demonstrate the process of this invention, the subsequent reaction of the resultant products with various reagents to form useful triorganotin compounds, and the biological activity of these compounds.

EXAMPLE 1 — Preparation of Dicyclohexylbutyltin Chloride

A. Preparation of the Grignard Reagent, Cyclohexylmagnesium Chloride

To a nitrogen-filled reaction vessel equipped with a stirrer, addition, funnel, thermometer and nitrogen inlet was added 179.9 g. (7.4 moles) of magnesium metal turnings, 150 cc. of tetrahydrofuran and an "initiation mixture" containing 59.4 g. (0.5 mole) of cyclohexyl chloride and 81.6 g. (0.5 mole) of cyclohexyl bromide. About 8 minutes later the temperature of the reaction mixture rose spontaneously to $130°$ C. A mixture containing 737.0 g. (6.2 moles) of cyclohexyl chloride and 1,500 cc. of tetrahydrofuran was added over a period of about 2.5 hours, during which time the contents of the flask were stirred at a moderate rate. Following completion of the addition the reaction mixture was heated to reflux temperature for an additional 3 hours.

B. Preparation of Dicyclohexyldibutyltin
$2C_6H_{11}MgCl+(C_4H_9)_2SnCl_2 \rightarrow (C_6H_{11})_2(C_4H_9)_2Sn$ A solution containing 1,060 g. of dibutyltin dichloride and 1 liter of benzene was added to the Grignard reagent prepared as described in Section A at a rate sufficient to maintain the temperature of the reaction mixture at $85°$ C. without external heating. Following completion of the addition, the reaction mixture was heated to reflux temperature for 22 hours, after which 750 cc. of a 10 percent by weight aqueous solution of hydrochloric acid and 700 cc. water were added. The unreacted magnesium and a small amount of additional solid material were removed by filtration. The organic layer was extracted using 500 cc. water containing about 40 g. of sodium chloride, followed by a second extraction of the organic layer using water, after which the organic layer was filtered to remove solid material. Distillation of the liquid remaining after removal of the solvent yielded 1,145.1 g. (82 percent yield) of dibutyldicyclohexyltin exhibiting a boiling range of $165°$ – $185°$ C. at pressures between 0.9 and 1.5 mm. of mercury. Analysis by vapor phase chromatography indicated a purity of 96.2 percent.

C. Preparation of dicyclohexylbutyltin chloride
$Sn(C_6H_{11})_2 (C_4H_9)_2 + SnCl_4 \rightarrow (C_6H_{11})_2C_4H_9SnCl + C_4H_9SnCl_3$ A mixture containing 2,639 g. (6.61 moles) of dibutyldicyclohexyltin and 3.5 liters of pentane were placed in a reaction vessel equipped with a thermometer, stirrer, additional funnel, water-cooled condenser, and nitrogen inlet. To this was gradually added, over a 45-minute period, a solution containing 1,723 g. (6.61 moles) of stannic chloride and 2 liters of pentane. The temperature of the reaction mixture was maintained at about 43° C. during the addition, after which the reaction mixture was heated to 43° C. for 1 hour, then cooled to ambient temperature and allowed to remain undisturbed overnight. After washing the reaction mixture three times with a 15:1 weight ratio mixture of water:concentrated hydrochloric acid, the pentane was removed by distillation. The resultant solid material was recrystallized using 3 liters of warm methanol. The weight of the dried material was 2,002 g. (80.3 percent yield) and the product melted between 60.5° and 63.0° C.

EXAMPLE 2 — Preparation of Dicyclohexylbutyltin Hydroxide

Dicyclohexylbutyltin hydroxide was prepared by reacting dicyclohexylbutyltin chloride, prepared as described in Example 1, with sodium hydroxide in a 1:1 molar ratio using a 3:1 volume ratio of methanol:water as the solvent. The mixture was heated at reflux temperature for 12 hours. The organotin hydroxide was dried under a circulating nitrogen atmosphere using sodium hydroxide pellets as the drying agent. Wet dicyclohexylbutyltin hydroxide was found to be very sensitive to atmospheric carbon dioxide, with which it reacts to form a carbonate; the hydroxide also readily dehydrates to the oxide under reduced pressure or mild heating. The product melted between 68° and 71° C. Analysis showed it to be 94.4 percent pure.

EXAMPLE 3 — Preparation of bis(dicyclohexylbutyltin) sulfide

To a solution of 140 grams (0.371 moles) of dicyclohexylbutyltin chloride, prepared as in Example 1, in 200 cc. of acetone was added a solution of 45.0 grams of sodium sulfide nonahydrate ($Na_2S \cdot 9H_2O$) in 350 cc. of water. The mixture was heated to reflux temperature for one hour, cooled, and the organic layer separated, washed with water, and dried over anhydrous magnesium sulfate. A portion of the solvent was removed using a rotary evaporator, and the remainder under reduced pressure (0.9 mm/85° C.).

Yield: 128.4 grams (97 percent). The product was a viscous liquid, $n^{27}_D = 1.5594$, exhibiting the following analysis.

Found: Sn, 33.14, S, 4.47; Cl, 0 percent
Theory: Sn, 33.12, S, 4.56; Cl, 0 percent EXAMPLE 4 — Preparation of bis(dicyclohexylbutyltin) oxide The oxide was prepared from 1,167 grams of water-wet dicyclohexylbutyltin hydroxide (Example 2) by dehydration at 80° C. under a pressure of about 50 mm of mercury. After being filtered, the resultant viscous liquid exhibited a weight of 593 grams (98 percent yield) and the following analysis.

Found: Sn, 34.24; Cl, 0.11 percent, $H_2O$ (Karl Fischer) 2.65 percent
Theory: Sn, 33.90; Cl, 0.0 percent, $H_2O$ (Karl Fischer) 2.57 percent
Product was 97.6 percent pure.

EXAMPLE 5 — Preparation of dicyclohexylbutyltin acetate

To a solution of 140 grams (0.2 moles) of bis(dicyclohexylbutyltin) oxide (prepared as described in Example 4) in 200 milliliters xylene was added 30 grams (0.5 mole, 25 percent excess) glacial acetic acid. The mixture was refluxed and water removed using a Dean-Stark trap. After 3 hours of refluxing, no further water was removed. The reaction mixture was concentrated using a rotary evaporator to remove the xylene and excess acetic acid. The solid residue was then ground up and dried under reduced pressure for 3 hours at 56° C. and 0.1 mm. mercury.

Yield: 156.5 grams (97.8%) of a white solid, melting range 55°–57° C. The product exhibited the following analysis.

Found: Sn, 29.85; Cl, 0.09; acetate, 13.99 percent
Theory: Sn, 29.59; Cl, 0.00; acetate, 14.70 percent.

EXAMPLE 6 — Preparation of dicyclohexylbutyltin 2-ethylhexanoate

To a solution of 77.0 grams (0.11 moles) of bis(dicyclohexylbutyltin) oxide prepared as in Example 4 in 200 milliliters toluene was added 31.7 grams (0.11 moles) 2-ethylhexanoic acid. The solution was refluxed for 2 hours, during which time 1.8 cc. of water collected in the Dean-Stark trap. The clear solution was concentrated using a rotary evaporator and the resultant solid dried at 55° C. for 3.5 hours under a pressure of 0.1 mm mercury.

Yield: 105.0 grams (98.4 percent) white solid, melting point 29°–30° C., exhibiting the following analysis:

Found: Sn, 24.46; Cl, 0.07 percent
Theory: Sn, 24.46; Cl, 0.00 percent
Product was 98.8 percent pure.

EXAMPLE 7 — Preparation of dicyclohexylbutyltin phenoxide 254.5 grams wet dicyclohexylbutyltin hydroxide (48.7 percent assay, remainder water); (0.345 moles on a dry basis) were added to 700 cc. of xylene and the organic phase separated from the aqueous phase. To the organic phase was added 32.5 grams (0.345 moles) phenol and the solution refluxed for 4 hours using a Dean-Stark trap to collect the water-xylene azeotrope. When the distillate no longer contained water, most of the xylene was removed using a rotary evaporator. The colorless oily residue was further concentrated at 50° C. under a pressure of 0.1 mm. mercury to a constant weight.

Yield: 142.9 grams (95.3 percent of theory) colorless liquid, $n^{2.35}_D = 1.5464$ Analysis:
Found: Sn, 28.09 percent
Theory: Sn, 27.27 percent EXAMPLE 8 — Preparation of dicyclohexylbutyltin fluoride To a solution of 113.3 grams (0.3 mole) dicyclohexylbutyltin chloride, prepared as in Example 3, in 1 liter of methanol was added slowly with stirring a solution of 29.6 grams (0.315 moles, dry) of potassium fluoride dihydrate $KF \cdot 2H_2O$ in 250 cc. methanol and 25 cc. water. The mixture was refluxed for 1 hour. The suspension was then cooled to 10° C., filtered and washed with a 10:90 volume ratio of methanol:water containing a small amount of a wetting agent. The white precipitate was dried in a vacuum oven at 50° C. to constant weight.

Yield: 107.0 grams (98.8 percent) white powder exhibiting the following analysis:

Found: Sn, 33.00; F, 5.47; Cl, 0.14 percent
Theory: Sn, 32.87; F, 5.26; Cl, 0.0 percent EXAMPLE 9 — Preparation of Dibutylcyclohexyltin chloride Tributylcyclohexyltin was prepared using a procedure similar to that described in Example 1 for dibutyldicyclohexyltin, with the exception that a 25 percent molar excess of cyclohexylmagnesium chloride was reacted with tributyltin chloride. The boiling point of the product was 123° C. under a pressure of 0.7 mm of mercury. A solution containing 37.3 grams (0.1 mole) of tributylcyclohexyltin in 50 cc. of pentane was placed in a reaction vessel equipped with a thermometer, stirrer, addition funnel, water-cooled condenser, and nitrogen inlet. To this was gradually added over a 25 minute period a solution containing 6.1 gram (0.1 mole) of stannic chloride in 50 cc. of pentane. During the addition, the temperature of the reaction mixture rose from 25° to 36° C. and the initially clear, colorless solution turned cloudy and yellow. After heating the solution to reflux temperature (36° C.) for 15 minutes, it was allowed to cool to ambient temperatures. The product was extracted using 55 cc. of a 1.2 molar aqueous hydrochloric acid solution. The resultant two-phase mixture was transferred to a separatory funnel and the lower aqueous layer drawn off and discarded. The organic layer was extracted with two 50 cc. portions of 1.2 molar aqueous hydrochloric acid solution followed by two 50 cc. portions of water. The organic layer was then dried over anhydrous sodium sulfate, which was subsequently removed by filtration. The filtrate was concentrated using a rotary evaporator to yield 32.8 grams (93.2 percent yield) of dibutylcyclohexyltin chloride, a hazy, colorless liquid exhibiting an index of refraction ($n^{25}_D$) of 1.5079. The crude product was distilled under reduced pressure to yield 29.3 grams of a product boiling between 139° and 140° C. at a pressure between 0.8 and 0.9 milliliters of mercury. Index of refraction ($n^{25}_D$) = 1.5097.

Analysis:
Found: Sn, 33.84; Cl, 10.02 percent
Theory: Sn, 33.77; Cl, 10.09 percent EXAMPLE 10 — Preparation of bis(dibutylcyclohexyltin) oxide The oxide was prepared by reacting dibutylcyclohexyltin chloride with sodium hydroxide (1:1.1 molar ratio) in methanol-water (4:1 volume ratio) at reflux temperature of 2 hours, after which the mixture was stirred overnight at ambient temperature. The mixture was then treated with excess water and the liquid oxide extracted with diethyl ether, after which the ether was removed over a 16 hour period using reduced pressure and ambient temperature. The resultant was a liquid exhibiting the following analysis:

Found: Sn, 36.95; Cl, 0.03 percent
Theory: Sn, 36.63; Cl, 0.0 percent

EXAMPLE 11 — Preparation of dibutylcyclohexyltin acetate

To a solution of 108.0 grams (0.167 moles) bis (dibutyl cyclohexyltin) oxide (prepared as described in Example 10) in 200 cc. dry toluene was added 25.0 grams (0.209 mole, 25 percent excess) glacial acetic acid. The solution was refluxed for 3 hours using a Dean-Stark trap to collect the water produced during the reaction as a toluene-water azeotropic mixture. 75 cc. of benzene were added (to retain the product in solution during transfer) and the solvents and excess acetic acid removed using a rotary evaporator. The residual solid was crushed and dried at 50° C. under a presence of 0.2 mm. mercury for 2 hours.

Yield: 121.5 grams (97.2 percent) of a white solid, melting point 64°–65° C.

Analysis:
Found: Sn, 31.63; acetate, 15.15; Cl, 0.0 percent
Theory: Sn, 31.64; acetate, 15.74; Cl, 0.0 percent EXAMPLE 12 — Preparation of dibutylcyclohexyltin 2-ethylhexanoate To a solution of 71.3 grams (0.11 moles) of bis(dibutylcyclohexyltin) oxide in 200 cc. toluene were added 31.7 grams (0.11 moles) of 2-ethylhexanoic acid. By-product water was removed from the reaction by azeotropic distillation over a period of 3 hours using a Dean-Stark trap. The clear solution was concentrated using a rotary evaporator and the residual liquid removed under reduced pressure (0.1 mm of mercury) at 55° C.

Yield: 100.8 grams (99.8 percent) of a white solid, melting point 39°–40° C.

Analysis:
Found: Sn, 26.00; Cl, 0.01 percent
Theory: Sn, 25.84; Cl, 0.00 percent
Product was 97% pure.

EXAMPLE 13 — Preparation of dibutylcyclohexyltin fluoride

To a solution of 117.2 grams (0.33 mole) dibutylcyclohexyltin chloride in 250 cc. of methanol was added with stirring a solution 32.9 grams (0.35 mole) KF·2H$_2$O in 130 cc. of methanol and 6 cc. of water. A solid precipitate formed almost immediately. The suspension was stirred at room temperature for 1 hour then filtered. The solid material was washed with two 100 cc. portions of methanol followed by two 150 cc. portions of distilled water, then dried in a vacuum oven (50 mm. Hg) at 70° C. for 2 hours, after which the dry solid was stirred for 2.5 hours in water (1.5 liters) containing 10 drops of wetting agent. The product was filtered and washed with deionized water until chloride-free then dried under reduced pressure to constant weight.

Yield: 105.0 grams (94 percent) white solid, melting point 270°–272° C.

Found: Sn, 35.65; F, 5.54
Theory: Sn, 35.43; F, 5.67 percent

EXAMPLE 14 — Preparation of bis(dibutylcyclohexyltin) sulfide

The sulfide was prepared by reacting dibutylcyclohexyltin chloride with sodium sulfide nonahydrate (2:1.01 molar ratio) in a water-acetone mixture (5:3 volume ratio) at reflux temperature for 1 hour followed by stirring overnight at room temperature. The organic layer was separated, filtered, then concentrated using a rotary evaporator under reduced pressure for 1 hour at 95° C. The product was a liquid ($n^{25}_D$ = 1.5375) exhibiting the following analysis:

Found: Sn, 35.81; S, 4.73;
Theory: Sn, 35.84; S, 4.82

A 10 gram sample of the sulfide was distilled under vacuum. Some decomposition was noticed. Boiling point 196° C/0.03 mm. mercury; $n^{25}_D$ = 1.5379.
Analysis: Sn, 35.83; S, 4.72.

The following section summarizes procedures used in preparing various asymmetric triorganotin halides, oxides, and a hydroxide. For the sake of brevity the various alkyl radicals are abbreviated as follows:

Me = methyl
Pr = n-propyl
Bu = n-butyl

Hex = n-hexyl
Cy = cyclohexyl
Oct = n-octyl

Unless otherwise specified, the reaction conditions employed were similar to those disclosed in the foregoing examples for the analogous cyclohexyltin compounds.

The physical properties and other relevant information for the asymmetric triorganotin chlorides and tetraorganotin compounds are listed in Tables I and II respectively.

EXAMPLE 15 — Preparation of Butyldimethyltin Chloride — BuMe$_2$SnCl

To a solution of trimethylbutyltin (88.4 g, 0.4 moles, (prepared by the reaction of trimethyltin chloride with butyl magnesium chloride) in 175 cc. dry pentane was added dropwise over a period of 0.5 hr. a solution of tin tetrachloride (104.2 g., 0.4 moles) in 175 cc. dry pentane, keeping the temperature between 25° and 30°. After the addition was complete the solution was refluxed (39° C.) for 0.25 hr. and then cooled to room temperature. To the solution at 20° C. was added a solution of 5 cc. concentrated aqueous hydrochloric acid (HCl) in 200 cc. water over a 3 minute period with vigorous agitation. The two-phase mixture was transferred to a separatory funnel and the lower aqueous phase (containing MeSnCl$_3$) withdrawn. The organic layer was then washed with another portion of 5 cc. concentrated aqueous HCl in 200 cc. water. The organic phase was dried over anhydrous magnesium sulfate, filtered, after which the solvent was removed using a rotary evaporator. The crude product was again filtered.

Yield: 84.2 g. (87.3 percent) colorless liquid $n^{24}_D$ = 1.4922

Analysis:
Theory: Sn, 49.18; Cl, 14.69 percent
Found: Sn, 48.69; Cl, 14.79 percent
Assay by VPC: 98.1 percent

TABLE I
ASYMMETRIC TRIORGANOTIN CHLORIDES

| Ex. No. | Compound | Tetraorganotin Reagent | Bp or Mp mm °C | $n_D$ | Temp °C | Yield % | VPC Assay* | TIN Calc'd % | TIN Found % | CHLORINE Calc'd % | CHLORINE Found % |
|---|---|---|---|---|---|---|---|---|---|---|---|
| 15 | BuMe$_2$SnCl | BuMe$_3$Sn | — — | 1.4922 | 24 | 87 | 98 | 49.18 | 48.69 | 14.69 | 14.79 |
| 16 | Bu$_2$MeSnCl | Bu$_2$Me$_2$Sn | — — | 1.4889 | 24 | 97 | 97 | 41.88 | 41.68 | 12.51 | 12.57 |
| 17 | MeOct$_2$SnCl | Me$_2$Oct$_2$Sn | — — | 1.4791 | 24 | 99 | 95 | 30.00 | 29.84 | 8.96 | 8.39 |
| 18 | Me$_2$OctSnCl | Me$_3$OctSn | — — | 1.4843 | 24 | 96 | 99 | 39.90 | 39.59 | 11.92 | 11.64 |
| 19 | Pr$_2$OctSnCl | Pr$_3$OctSn | 88–90 0.02 | 1.4856 | 21 | 54[1] | 99 | 33.57 | 33.68 | 10.03 | 9.94 |
| 20 | Me$_2$CySnCl | Me$_3$CySn | 33–35[2] — | — | — | 89 | 99 | 44.39 | 44.12 | 13.26 | 13.04 |
| 21 | MeCy$_2$SnCl | Me$_2$CySn | 52–54[2] — | — | — | 97 | — | 35.38 | 34.80 | 10.56 | 10.50 |
| 22 | Pr$_2$CySnCl | Pr$_3$CySn | — — | 1.5142 | 22 | 97 | 99 | 36.69 | 36.73 | 10.69 | 10.87 |
| 23 | PrCy$_2$SnCl | Pr$_2$Cy$_2$Sn | 33–35[2] — | — | — | 95 | — | 32.65 | 32.95 | 9.75 | 9.72 |
| 24 | HexCy$_2$SnCl | Hex$_2$Cy$_2$Sn | — — | 1.5218 | 24 | 83 | 99 | 29.26 | 29.41 | 8.74 | 8.67 |
| 25 | Hex$_2$CySnCl | Hex$_3$CySn | — — | 1.4986 | 23 | 97 | 96 | 29.12 | 28.84 | 8.70 | 8.39 |

NOTES
Bu = n-Butyl
Me = Methyl
Oct = n-octyl
Ø = phenyl
1 = after distillation?
2 = melting point
* = % of total area underneath all peaks $\left(\frac{\text{area of product peak}}{\text{total area of all peaks}} \times 100\%\right)$
Pr = n-propyl
Cy = cyclohexyl
Hex = n-hexyl

TABLE II
ASYMMETRIC TETRAORGANOTIN COMPOUNDS

| Ex. No. | Compound | Organotin Reactant | Grignard Reagent | B.p. °C | Pressure mm Hg. | $n^{22}_D$ | Yield % | %Tin Calc'd | Found | VPC[4] Assay % |
|---|---|---|---|---|---|---|---|---|---|---|
| 15 | BuMe$_3$Sn | Me$_3$SnCl | BuMgCl | 150–2 | 760 | 1.4558 | 54 | — | — | — |
| 16 | Bu$_2$Me$_2$Sn | Bu$_2$SnCl$_2$ | MeMgCl | 77–88 | 4.3–4.5 | — | — | 45.13 | 45.23 | — |
| 17 | Me$_2$Oct$_2$Sn | Oct$_2$SnCl$_2$ | MeMgCl | — | — | 1.4656 | 97 | 31.64 | 31.41 | 98 |
| 18 | Me$_3$OctSn | OctSnCl$_3$ | MeMgCl | — | — | 1.4595 | 95 | 42.85 | 42.24 | 96 |
| 19 | Pr$_3$OctSn | Pr$_3$SnCl | OctMgCl | 93–97 | 0.04 | 1.4705 | 90 | 32.86 | 33.06 | 99 |
| 20 | Me$_3$CySn | Me$_3$SnCl | CyMgCl | 33–40 | 0.2–0.07 | 1.4900 | 88 | 48.07 | 47.27 | 98 |
| 21 | Me$_2$Cy$_2$Sn | Me$_2$SnCl$_2$ | CyMgCl | 89–91 | 0.15 | 1.5148 | 85 | 37.68 | 37.21 | 98 |
| 22 | Pr$_3$CySn | Pr$_3$SnCl | CyMgCl | 78–83 | 0.02 | 1.4939 | 94 | 35.85 | 35.90 | 99 |
| 23 | Pr$_2$Cy$_2$Sn | Pr$_2$SnCl$_2$ | CyMgCl | 118–125 | 0.01 | 1.5145[2] | 76 | 31.98 | 32.15 | 100 |
| 24 | Hex$_2$Cy$_2$Sn | Hex$_2$SnCl$_2$ | CyMgCl | 176–80 | 0.01 | 1.5016[3] | 82 | 26/07 | 25.47 | 97 |
| 25 | Hex$_3$CySn | Hex$_3$SnCl | CyMgCl | — | — | 1.4828[2] | 95 | 25.95 | 25.45 | 94 |

[1] melting point
[2] at 23°
[3] at 21°
[4] area %

EXAMPLE 16 — Preparation of Dibutylmethyltin Chloride – Bu$_2$MeSnCl

This compound was prepared in a manner similar to that described for butyldimethyltin chloride. To a solution of 197.5 g. (0.75 moles) dimethyldibutyltin in 375 cc. pentane was added dropwise over 1 hour a solution of 195.5 g (0.75 moles) tin tetrachloride SnCl$_4$ in 375 cc. pentane keeping the temperature at 25°–30° C. The reaction mixture was then heated to reflux temperature for 0.25 hr. then cooled to ambient temperature. The mixture was extracted twice with 10 ml. of concentrated aqueous HCl in 400 cc. water (to remove MeSnCl$_3$) and the organic phase dried over anhydrous magnesium sulfate. After filtration and solvent removal, the product was obtained as a colorless liquid.

Yield: 205.5 g (96.7 percent) $n^{24}_D = 1.4889$
Analysis:
  Theory: Sn, 41.88; Cl, 12.51 percent
  Found: Sn, 41.68; Cl, 12.57 percent
Assay by VPC (Vapor Phase Chromotography): 26.6 percent EXAMPLE 17 — Preparation of Methyldioctyltin Chloride – MeOct$_2$SnCl To a solution of 131 g. (0.35 moles dioctyldimethyltin prepared by the reaction of dioctyltin dichloride with methyl magnesium chloride) in 250 cc. pentane was added a solution of tin tetrachloride (91.2 g. 0.35 moles) in 250 cc. pentane over a period of 1 hour, maintaining the temperature between 25° and 31° C. After the addition was complete the reaction was heated to reflux for 0.25 hour, then cooled to room temperature. A solution of 5 cc. of concentrated aqueous hydrochloric acid in 150 cc. water was added to the reaction mixture, which was stirred vigorously for 5 minutes. The two-phase mixture was transferred to a separatory funnel and the bottom aqueous layer withdrawn. The organic phase was again extracted with a solution of 5 ml. concentrated aqueous HCl in 150 cc. water. The organic layer was dried over anhydrous magnesium sulfate after which the solvent was removed.

Yield: 136.5 g (98.6 percent) colorless liquid $n^{24}_D = 1.4791$
Analysis:
  Theory: Sn, 30.00; Cl, 8.96 percent
  Found: Sn, 29.84; Cl, 8.39 percent
Assay by VPC: 95.0 percent EXAMPLE 18 — Preparation of Dimethyloctyltin Chloride – Me$_2$OctSnCl To a solution of 69.3 g (0.25 moles) octyltrimethyltin (prepared by the reaction of trimethyltin chloride with octyl magnesium chloride) in 125 cc. pentane was added a solution of tin tetrachloride (65.1 g) in 125 ml. pentane over a period of 0.5 hour maintaining the temperature between 25° and 30° C. The solution was heated to reflux temperature for 0.25 hour after the addition was complete, then cooled to ambient temperature.

To the reaction mixture was then added a solution of 2.5 ml. concentrated aqueous HCl in 125 cc. water and vigorous stirring was continued for 5 minutes. The two-phase mixture was then transferred to a separatory funnel and the bottom aqueous layer withdrawn. The organic layer was again extracted using aqueous HCl, after which it was dried and the solvent removed.

Yield: 71.5 g (96.1%) colorless liquid $n^{24}_D = 1.4843$
Analysis:
  Theory: Sn, 39.90; Cl, 11.92 percent
  Found: Sn, 39.59; Cl, 11.649
Assay by VPC: 93.5 percent EXAMPLE 19 — Preparation of Di-n-propyloctyltin Chloride – Pr$_2$OctSnCl To a solution of 90.3 g (0.25 moles) tri-*n*-propyloctyltin (prepared by the reaction of tripropyltin chloride with octylmagnesium chloride) in 187.5 cc. pentane was added slowly over 0.5 hour a solution of 65.3 g tin tetrachloride in 187.5 cc. pentane keeping the temperature between 14° and 15° C.

After addition, the reaction was stirred for an additional 0.5 hour. To the solution was then added a mixture of 55 cc. concentrated aqueous HCl, 187.5 cc. water and 200 cc. pentane with vigorous stirring. The reaction mixture was then transferred to a separatory funnel and the lower aqueous layer drawn off. The organic layer was washed with a solution of 5 cc. concentrated aqueous HCl in 187.5 cc. water, then dried over magnesium sulfate. The crude product was isolated by solvent removal.

Yield: 84.0 g.

Vapor phase chromatography indicated that the crude product consisted of 79.6 percent dipropyloctyltin chloride, 3.6 percent unreacted tripropyloctyltin and 16.8 percent low boiling constituents.

The crude material (80.0 g.) together with 9.0 g. from a previous preparation were fractionally distilled under reduced pressure using a Vigreaux column. 53.3 of a middle fraction were obtained, b.p. 88°–90°, 0.02 mm. $n^{24}_D = 1.4856$.

Yield: (adjusted) ~ 54 percent
Analysis:
  Theory: Sn, 33.57; Cl, 10.03 percent
  Found: Sn, 33.68; Cl, 9.94 percent
Assay by VPC: 98.8 percent EXAMPLE 20 — Preparation of Dimethylcyclohexyltin Chloride – Me$_2$CySnCl To a solution of trimethylcyclohexyltin (1.23.5 g. 0.5 moles) (prepared by the reaction of trimethyltin chloride with cyclohexyl magnesium chloride) in 300 cc. pentane was added dropwise a solution of tin tetrachloride (130.3 g, 0.5 moles) over a 40 minute period while maintaining the temperature between 25°–30° C. After the addition was completed, the solution was heated to reflux temperature (40° C.) for 0.25 hour and then cooled to room temperature. The solution was extracted twice with a solution of 9 cc. concentrated aqueous HCl in 340 cc. water to remove the methyltin trichloride. The organic layer was separated, dried over anhydrous magnesium sulfate and freed of solvent. The product was a crystalline white solid (m.p. 33°–35°) that weighed 118.3 g. (89 percent) yield.

Analysis:
  Theory: Sn, 44.39; Cl, 13.26 percent
  Found: Sn, 44.12; Cl, 13.04 percent
Assay by VPC: 99.2 percent EXAMPLE 21 — Preparation of Methyldicyclohexyltin Chloride – MeCy$_2$SnCl This compound was prepared in a manner similar to dimethylcyclohexyltin chloride (Example 20) from dimethyldicyclohexyltin and tin tetrachloride in a 1:1 molar ratio using pentane as the solvent. The product was a white solid m.p. 52°–54°.
Yield: 97 percent
Analysis:
　Theory: Sn, 35.38; Cl, 10.56 percent
　Found: Sn, 34.80; Cl, 10.50 percent EXAMPLE 22 — Preparation of Di-n-propylcyclohexyltin Chloride – Pr$_2$CySnCl This compound was prepared using the method employed for preparing the foregoing compounds from tripropylcyclohexyltin and tin tetrachloride in a 1:1 molar ratio using pentane as the solvent. The product was a colorless liquid $n^{22}_D = 1.5142$.
Yield: 97 percent
Analysis:
　Theory: Sn, 36.69; Cl, 10.69 percent
　Found: Sn, 36.73; Cl, 10.87 percent
Assay by VPC: 99.2 percent EXAMPLE 23 — Preparation of n-propyldicyclohexyltin Chloride – PrCy$_2$SnCl This compound was prepared as above from dipropyldicyclohexyltin and tin tetrachloride in a 1:1 molar ratio using pentane as the solvent. The product was a white crystalline solid, m.p. 33°–35°.
Yield: 95 percent
Analysis:
　Theory: Sn, 32.65; Cl, 9.75 percent
　Found: Sn, 32.95; Cl, 9.72 percent EXAMPLE 24 — Preparation of n-Hexyldicyclohexyltin Chloride – HexCy$_2$SnCl This compound was prepared from di-n-hexyldicyclohexyltin and tin tetrachloride in a 1:1 molar ratio in pentane. The addition required 0.5 hour after which the solution was refluxed for 35 minutes. The product was a colorless liquid, $n^{24}_D = 1.5218$.
Analysis:
Theory: Sn, 29.26; Cl, 8.74 percent
　Found: Sn, 29.41; Cl, 8.67 percent
Assay by VPC: 99.1 percent EXAMPLE 25 — Preparation of Di-n-Hexylcyclohexyltin Chloride – Hex$_2$CySnCl This compound was prepared using the foregoing method described for HexCy$_2$SnCl from tri-n-hexylcyclohexyltin and tin tetrachloride in a 1:1 molar ratio in pentane. The product was a yellow liquid, $n^{23}_D = 1.4986$.
Yield: 97 percent
Analysis:
　Theory: Sn, 29.12; Cl, 8.70 percent
　Found: Sn, 28,84; Cl, 8.39 percent
Assay by VPC: 95.7 percent EXAMPLE 26 — Preparation of Bis-dibutylmethyltin Oxide – (Bu$_2$MeSn)$_2$O To a solution of 16.8 g. (0.42 moles) sodium hydroxide in a mixture of methanol (300 cc.) and water (50 cc.) were added 99.2 g. (0.35 moles) dibutylmethyltin chloride and the mixture heated to reflux temperature (80° C.) for 0.5 hour. The mixture was then cooled to 40° C. at which time 600 cc. of water was added with stirring. The mixture was transferred to a separatory funnel and and 400 cc. ether was added. The organic phase (containing suspended solids) was removed and filtered yielding 1.24 g. of a white solid m.p. 360° C. The organic layer was dried over anhydrous magnesium sulfate, after which the solvent was removed, using a rotary evaporator. The product was a colorless liquid. 84.8 g (95 percent yield) $n^{25.6}_D = 1.4836$.
Analysis:
　Theory: Sn, 46.37; Cl, 0.0 percent
　Found: Sn, 45.80; Cl, 0.04 percent
Assay by potentiometric titration: 93.4 percent
Assay by VPC: 96.7 percent EXAMPLE 27 — Preparation of bis-methyldioctyltin Oxide – (MeOct$_2$Sn)$_2$O This compound was prepared as described above from methyldioctyltin chloride in 90 percent yield. The product was a colorless liquid $n^{22.5}_D = 1.4789$ which over a period of several days became a semi-solid.
Analysis:
　Theory: Sn, 32.24; Cl, 0.0 percent
　Found: Sn, 32.03; Cl, 0.09 percent
Assay by potentiometric titration: 96 percent EXAMPLE 28 — Preparation of Dimethylcyclohexyltin Hydroxide – Me$_2$CySnOH This compound was prepared using the method described in Example 27 from dimethylcyclohexyltin chloride by alkaline hydrolysis (20 percent molar excess sodium hydroxide, reflux 1 hour). The product was a white solid, m.p. 74–76 percent.
Yield: 78.5 percent.
Analysis:
　Theory: Sn, 47.68 percent; Cl, 0.0 percent
　Found: Sn, 47.28; Cl, 0.03 percent
Assay by potentiometric titration: 97.9 percent This product appeared to be stable at room temperature but readily dehydrated to the oxide under the influence of heat and reduced pressure.

BIOLOGICAL ACTIVITY OF ASYMMETRIC ORGANOTIN DERIVATIVES

The novel compounds of the foregoing examples can be applied to soil or plants, by a variety of means. Compositions suitable for application to soil or plants include liquid extending agents such as solvent or diluents within which the novel active compounds of this invention are dissolved or suspended; wetting or emulsifying agents which assist in the formation of uniform dispersions of the solution of the active ingredient in the extending agent and, optionally, an adhesive agent or spreading agent which improves the contact of the novel compounds of this invention with soil and plant surfaces or other surfaces to be protected.

The novel compounds of this invention need not be dissolved in the extending agent, but may be merely dispersed or suspended in the extending agent as a suspension or emulsion. The novel compounds of this invention may first be dissolved in a suitable organic solvent and the organic solution of the active ingredient then incorporated in water or in an aqueous extending agent in the form of a heterogeneous dispersion. Examples of some suitable organic solvent for use as extending agent includes hexane, benzene, toluene, acetone, cyclohexanone, methyl ethyl ketone, isopropanol, butanediol, methanol, diacetone alcohol, xylene, dioxane, isopropyl, ether, ethylene dichloride, tetrachlorethane, hydrogenated naphthalene, solvent naphtha, petroleum fractions, such as kerosene, and the like.

Solid extending agents in the form of particulate solids are very useful in the practice of the present invention. In using this type of extending agent, the active ingredient is either absorbed or dispersed on or in a finely-divided solid material. Preferably, the solid extending agents are not hygroscopic, but are materials which render the compositions permanently dry and free-flowing. Suitable solid extending agents include the natural clays such as china clays, the bentonites, and attapulgites; other minerals such as talc, pyrophyllite, quartz, diatomaceous earth, fuller's earth, chalk, rock phosphate, kaolin, kieselguhr, volcanic ash, salt; chemically modified minerals such as acid-washed bentonite, precipitated calcium phosphate, calcium carbonate, calcinated magnesia, colloidal silica; and other solid materials such as powdered cork, powdered wood, and powdered pecan or walnut shells. These materials are used in finely divided form, of approximately a size range passing through 20 to 40 mesh or of a finer size. Particulate solid concentrates of compositions are applied to the soil by admixture at the time of application with a particulate solid carrier material.

If desired, the novel compounds of this invention can be applied in a wettable powder using a liquid carrier material. When used by this method, a wetting agent or surface active agent is added to a concentrate composition to render the particulate solid extending agent wettable by water to obtain a stable aqueous dispersion or suspension suitable for use as a spray. Also the extending agent applied as a wettable powder is used in very finely divided form preferably in a size small as 100 mesh or smaller. Surface active agents for wetting emulsifying or dispersing serve in providing uniform dispersion of the novel compounds of this invention of liquid and solid types may be either anionic or cationic, or non-ionic types, including mixtures thereof. Suitable surface active agents are the organic surface active agents capable of lowering the surface tension of water and include conventional soaps, such as the water-soluble salts of long chain carboxylic acids; the amino soaps, such as the amine salts of long-chain carboxylic acids; the sulfonated animal, vegetable mineral oils; quaternary salts of high molecular weight acids; rosin soaps, such as salts of abietic acid; sulfuric acid salts of high molecular weight organic compounds; algin soaps; ethylene oxide condensed with fatty acids, alkyl phenols and mercaptans; and other simple and polymeric compositions having both hydrophilic and hydrophobic functions.

Concentrated compositions containing the novel compounds of this invention should have the active novel compounds and the surface active agents present in higher concentrations than the toxicant compositions applied in the field so that upon dilution with a solid or liquid carrier resulting compositions will contain optimum proportions of the active novel compounds and surface active agent. The compositions should be such to obtain uniform distributions and to maintain the active novel compounds to promote rapid assimilation by plants.

The use of a surface active agent may be necessary in formulating a liquid concentrate composition to obtain a sufficiently high concentration of the novel compounds of this invention. The liquid extending agent must be selected not only on the basis of the amount of the novel compound of this invention dissolved but also upon the basis of this solution and temperature of the total composition. Thus, in some formulations, a particular combination of solvents gives us sufficiently low solvent temperatures but the amount of the novel compound dissolved or dispersed in the mixture is insufficient and a suitable surface active agent must be selected such that the novel compound can be dispersed in the composition. Preferably a concentrate composition has a solution temperature below 0° C., although compositions having higher solution temperatures can be used.

The concentration of the novel compounds of this invention in a particulate solid or dust concentrate composition may vary over wide ranges depending upon the nature of the solid extending agent. It is to be noted that surface active agents are not usually required in dust concentrate composition, although they can be used if desired. If a dust concentrate composition is to be applied as a wettable powder however, a surface active agent should be added to the concentrate composition. Ordinarily, the amount of surface activated agent will be in the amount of 0.1–15 percent by weight of the composition.

The carrier material used for the uniform distribution of the novel compounds of this invention used as pesticides may be either liquid or particulate solid materials. The liquid and solid extending agents used to prepare concentrate compositions may also be used as the carrier. However, the use of concentrate composition materials carrier may not be economical. Water is the preferred liquid carrier, both for use with the liquid concentrate compositions and wettable powder concentrate. Suitable particulate solid carriers include the particulate extending agents noted above as well as solid fertilizers, such as ammonium nitrate, urea, super phosphate, as well as other materials in which plant organisms may take root and grow such as compost, sand, and humus. Liquid and dust concentrate compositions containing the novel compound of this invention can also contain other additaments such as fertilizer and pesticides. These additaments may be used as, or in combination with the carrier materials.

Compositions containing the novel compounds of this invention may be applied to plants in a conventional manner. Thus, dust and liquid compositions may be applied to the foliage of growing plants by use of powered-dusters, broom and hand sprayers, and other spray dusters. Compositions containing the novel compounds of this invention can be applied from airplanes as dust.

TESTING PROCEDURE

1. General

The mixed triorganotin compounds of this invention were formulated into sprayable compositions by first dissolving or dispersing them in a 90/10 weight ratio mixture of water/acetone containing a non-ionic surfactant. The resultant stock solutions or dispersions were diluted with a water-surfactant mixture to obtain the desired concentration of tin compound while maintaining the surfactant concentration at 100 parts per million (ppm.). Samples which proved difficult to emulsify were homogenized using a colloid mill or tissue homogenizer.

2. Evaluation of effectiveness of mixed triorganotin compounds against specific organisms.

The efficacy of several triorganotin compounds of this invention as fungicides, insecticides, and herbicides was evaluated, and the results were summarized in Tables III, IV, and V. The following test specimens were employed.

Fungi: Bean powdery mildew, bean rust, leaf spot of rice (helminthosporium).

Insects: Green peach aphid, black bean aphid, two-spotted spider mite, Mexican bean beetle, Southern armyworm.

Weeds: Morning Glory, Zinnia, Mustard, Fox Millet.

3. Specific Evaluation Procedures.

A. Bean Powdery Mildew

Tender green bean plants with fully expanded primary leaves are innoculated with spores of the powdery mildew fungus (erysiphe polygoni) 48 hours prior to applications of test chemicals. Chemicals are applied at the concentrations indicated in the following tables by placing the plants on a revolving turntable and spraying them with the test chemical formulation. When the spray deposit dries, the plants are placed in a greenhouse for between 7 and 10 days, at which time the amount of mildew on the primary leaves is rated. Plants not treated with chemical pesticides served as controls.

B. Bean Rust

Pinto bean plants with fully expanded primary leaves are innoculated with spores of the bean rust fungus (uromyces phaseoli) and incubated for 24 hours. Chemicals are then applied and the plants evaluated using the procedure specified for the bean powdery mildew.

C. Leaf Spot of Rice (helminthosporium)

Rice plants are sprayed with formulations containing the triorganotin compound as described in the preceding Section A. As soon as the spray has dried, the plants are innoculated with a spore suspension of helminthosporium and placed in an incubation chamber for 24 hours, after which they are removed and held until lesions have developed. Plants not treated with chemical pesticides served as controls.

D. Green Peach or Black Bean Aphid

1. Contact.

A potted nasturtium plant infested with the aphid is placed on a turntable and sprayed with the test chemical formulation at the specified concentration. After 24 hours, the degree of control is evaluated.

2. Systemic.

An infested plant is treated by applying 20 cc. of the test chemical formulation to the soil surrounding the plant and evaluated as described in part 1.

E. Two-spotted Spider Mite (*Tetranychus Telarius*)

The evaluation procedures were identical with D-1 and D-2 above with the exception that the time period between treatment and evaluation is 7 days.

F. Mexican Bean Beetle

Bean leaves are dipped in a formulation of the test chemical and allowed to dry. Individual treated leaves are placed in Petri dishes and five bean beetle larvae (Epilachna varivestis) introduced in each of two separate dishes. Three days later observations are made with respect to the number of individuals killed and repelled from feeding.

G. Southern Armyworm (*Prodenia eridonia*)

Evaluation procedure is identical to F above.

H. Herbicidal Activity

The plants are sprayed with formulations of the triorganotin compounds when the first true leaves have appeared. The responses are rated 12 to 16 days after treatment, and the results are summarized in Table V. The concentration of triorganotin compound is expressed in pounds per acre, and appears in parenthesis below the efficacy rating, expressed in degree of plant injury.

100 = plants killed
70–90 = severe injury
40–60 = moderate injury
10–30 = slight injury
0–9 = no injury TABLE III.—PERCENT EFFECTIVENESS OF ASYMMETRIC TRIORGANOTIN COMPOUNDS IN COMBATING FUNGI AND INSECTS

| Compound | Bean mildew | Bean rust | Helminthosporium | Green peach aphid | Black bean aphid | Two-spotted spider mite (adult/nymph) | 2, 3, 6 |
|---|---|---|---|---|---|---|---|
| $Bu_2CySnCl$ | 90–100 (20) | | | [3]80 (250) | [4]40 (250) | [3,2]100 (250) | 100/100 (250) | 100/100 (50) |
| $BuMe_2SnCl$ | 80 [2]50 (100) (20) | 80 70 (200) (50) | [2]50 [3]100 (200) | [3]100 [4]100 (250) (250) | [3,2]70 [4,2]100 (250) (250) | | |
| $Bu_2MeSnCl$ | 80 [2]50 (100) (20) | 50 (200) | [2]40 (200) | [3]100 [4]60 (250) (250) | | 100/100 (250) | |
| $MeOct_2SnCl$ | 80 [2]30 (100) (20) | 80 (200) | 80 [2]50 (200) (50) | [3]100 [4]40 (250) (250) | [3,2]40 (250) | 100/100 (250) | 90/30 (50) |
| $Me_2OctSnCl$ | 70 (20) | | 80 [2]40 (200) (50) | [3]100 (250) | [3]100 (250) | 100/100 (250) | 50/10 (50) |
| Control (untreated) | 0 | 0 | 20 | 20 | 0 | 0 0 | |

[1] Number in parenthesis refers to parts per million of tin compound applied based on total weight of treatment composition.
[2] Average of two trials.
[3] Treatment compositon sprayed on plant.
[4] Treatment composition applied to soil.
[5] Nasturtium plants used as host.
[6] Bean plants as hosts.

TABLE IV

EFFECTIVENESS OF ASYMMETRIC TRIORGANTIN COMPOUNDS IN KILLING AND CONTROLLING FEEDING OF INSECTS

| Compound | MEXICAN BEAN BEETLE | | | | SOUTHERN ARMYWORM | |
|---|---|---|---|---|---|---|
| | % Killed | | % Feeding | | % Killed | % Feeding |
| $Bu_2CySnCl$ | | | | | 60 40 | 100 | 10 |
| (50) | | (250) | | | $(250)^1$ | (250) |
| $BuMe_2SnCl$ | 100 | | 0 | 30 | 100 | 10 |
| | (250) | | (250) | (50) | (50) | (10) |
| $Bu_2MeSnCl$ | 100 | | 50 | 60 | 100 | 80 |
| | (250) | | (50) | (10) | (250) | (50) |
| $MeOct_2SnCl$ | 100 | | 10 | | 100 | 10 |
| | (250) | | (50) | | (250) | (50) |
| $Me_2OctSnCl$ | 80 | | 30 | 40 | 100 | 50 |
| | (250) | | (50) | (10) | (250) | (50) |
| Control (untreated) | 0 | | 95 | | 0 | 93 |

[1] numbers in parentheses refer to concentration (in ppm) of tin compound in treatment formulation

TABLE V

EFFECTIVENESS OF ASYMMETRIC TRIORGANOTIN COMPOUNDS AS POST-EMERGENT HERBICIDES

| Compound | PLANTS | | | | | | | | |
|---|---|---|---|---|---|---|---|---|---|
| | Zinnia | | | Mustard | | | Foxtail Millet | | Morning Glory |
| $Bu_2CySnCl$ | 90 | 20 | 100 | 70 | 60 | 90 | 20 | 50 | 20 |
| | $(10)^1$ | (5) | (10) | (5) | (1.25) | (10) | (5) | (10) | (5) |
| $BuMe_2SnCl$ | 100 | 70 | 100 | 60 | | 100 | $70^2$ | 90 | $20^2$ |
| | (10) | (1.25) | (10) | (1.25) | | (10) | (5) | (10) | (5) |
| $Bu_2MeSnCl$ | 100 | 20 | 100 | 80 | | 90 | 70 | $40^3$ | 20 |
| | (5) | (1.25) | (5) | (0.3) | | (10) | (5) | (10) | (5) |
| $MeOct_2SnCl$ | 100 | 60 | 100 | 40 | | 80 | 0 | 90 | 20 |
| | (10) | (5) | (10) | (1.25) | | (10) | (5) | (10) | (5) |
| $Me_2OctSnCl$ | 100 | 20 | 100 | 90 | | 100 | 80 | 100 | 90 |
| | (5) | (1.25) | (5) | (1.25) | | (10) | (5) | (10) | (5) |

[1] numbers in parentheses represent concentration of tin compound, expressed in pounds per acre of treated area
[2] slight stunting of growth observed
[3] moderate stunting of growth observed Although this invention has been illustrated by reference to specific examples, changes therein which clearly fall within the scope of the invention will be apparent to those skilled in the art. It is, therefore, to be limited solely by the scope of the appended claims.

What is claimed is:

1. A method for preparing high yields of substantially pure asymmetric triorganotin halides of the formula $R_nR'_{(3-n)}SnX$, wherein R represents a monovalent linear aliphatic hydrocarbon radical containing up to six carbon atoms, R' represents a monovalent aliphatic or cycloaliphatic hydrocarbon radical containing up to eight carbon atoms, with the proviso that the molecular weight of R' exceeds that of R by at least 42 grams per mole except when R' is a cycloaliphatic hydrocarbon radical, X represents a chlorine or bromine atom, and n is an integer selected from 1 and 2, said method comprising reacting substantially equimolar quantities of a tetraorganotin compound $R_{(n-1)}R'_{(3-n)}Sn$ and a stannic tetrahalide $SnX_4$, adding a suitable solvent to dissolve the by-product $RSnX_3$ and isolating the triorganotin halide in substantially pure form.

2. The method of claim 1 wherein a solution of the stannic tetrahalide is added to a solution of the tetraorgano tin compound.

3. The method of claim 1 wherein the stannic halide is stannic chloride or stannic bromide.

4. The method of claim 2 wherein the solvent for both reactants is a hydrocarbon.

5. The method of claim 2 wherein the solvent for both reactants is pentane.

6. The method of claim 2 wherein the temperature is maintained between −25° and 80° C. during the addition of the stannic tetrahalide.

7. The method of claim 1 wherein an aqueous solution of hydrochloric acid is employed to dissolve the by-product to $RSnX_3$.

* * * * *

UNITED STATES PATENT OFFICE
CERTIFICATE OF CORRECTION

Patent No. 3,789,057          Dated January 29, 1974

Inventor(s) Gerald H. Reifenberg and Melvin H. Gitlitz

It is certified that error appears in the above-identified patent and that said Letters Patent are hereby corrected as shown below:

Page 1 and Page 2 - Title of patent should read

--A PROCESS FOR PREPARING ASYMMETRICAL TRIORGANOTIN HALIDES--

Table IV (columns 19 and 20) should appear as per the attached.

Claim 7, line 3, cancel "to".

Signed and sealed this 30th day of July 1974.

(SEAL)
Attest:

McCOY M. GIBSON, JR.
Attesting Officer

C. MARSHALL DANN
Commissioner of Patents